(12) United States Patent
van der Meijden et al.

(10) Patent No.: US 11,781,333 B2
(45) Date of Patent: Oct. 10, 2023

(54) SKIMMING DEVICES AND RELATED METHODS

(71) Applicant: ZODIAC POOL SYSTEMS LLC, Carlsbad, CA (US)

(72) Inventors: Hendrikus Johannes van der Meijden, Midrand (ZA); David Hurrle, Carlsbad, CA (US); Dustin Borg, Poway, CA (US); Andre Schutte, Johannesburg (ZA)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

(21) Appl. No.: 17/189,800

(22) Filed: Mar. 2, 2021

(65) Prior Publication Data
US 2021/0277677 A1    Sep. 9, 2021

Related U.S. Application Data

(60) Provisional application No. 62/987,158, filed on Mar. 9, 2020.

(51) Int. Cl.
*E04H 4/12*    (2006.01)
*B01D 29/90*    (2006.01)
(Continued)

(52) U.S. Cl.
CPC ......... *E04H 4/1263* (2013.01); *B01D 29/014* (2013.01); *B01D 29/902* (2013.01); *B01D 29/965* (2013.01); *B01D 35/1475* (2013.01); *C02F 1/001* (2013.01); *C02F 1/40* (2013.01); *B01D 2201/64* (2013.01);
(Continued)

(58) Field of Classification Search
CPC ......... B01D 2201/64; B01D 29/014; B01D 29/902; B01D 29/965; B01D 35/1475; C02F 1/001; C02F 1/40; C02F 2103/42; C02F 2201/005; C02F 2301/066; E04H 4/1254; E04H 4/1263
See application file for complete search history.

(56) References Cited

U.S. PATENT DOCUMENTS 3,381,822 A * 5/1968 Martin ............... E04H 4/1209
                                                  210/407
4,305,830 A * 12/1981 Shimura ............ E02B 15/108
                                                  210/801
(Continued)

FOREIGN PATENT DOCUMENTS

EP    2712984 A2 *    4/2014    ........... E04H 4/1263

OTHER PUBLICATIONS

English Translation of EP 2712984 A2 from PE2E search database. (Year: 2014).*

(Continued)

*Primary Examiner* — Terry K Cecil
(74) *Attorney, Agent, or Firm* — Kilpatrick Townsend & Stockton LLP

(57) ABSTRACT

Skimming devices may use pressurized water from, for example, a return line of a swimming pool or spa. The devices may be adjustable vertically and levelled relative to an upper water surface (waterline) of a pool. They additionally may create "blades" of debris-laden pool water entering their floating heads so as to move debris smoothly and efficiently over wings or foils into associated filters.

13 Claims, 22 Drawing Sheets

(51) Int. Cl.
    *B01D 29/96*     (2006.01)
    *B01D 35/147*     (2006.01)
    *C02F 1/00*     (2023.01)
    *C02F 1/40*     (2023.01)
    *C02F 103/42*     (2006.01)
    *B01D 29/01*     (2006.01)

(52) U.S. Cl.
    CPC .... *C02F 2103/42* (2013.01); *C02F 2201/005* (2013.01); *C02F 2301/066* (2013.01)

(56) References Cited

U.S. PATENT DOCUMENTS

| | | | | |
|---|---|---|---|---|
| 4,746,424 A * | 5/1988 | Drew | ............... | E04H 4/1263 |
| | | | | 210/167.2 |
| 5,078,863 A | 1/1992 | Durigon | | |
| 5,350,508 A * | 9/1994 | Van der Watt | ........ | E04H 4/1263 |
| | | | | 210/167.2 |
| 6,041,453 A * | 3/2000 | Barrow | ................ | E04H 4/1263 |
| | | | | 210/167.2 |
| 6,086,759 A | 7/2000 | Bisseker | | |
| 11,236,522 B2 * | 2/2022 | Marano | ................ | E04H 4/169 |

OTHER PUBLICATIONS

International Application No. PCT/US2021/020440, International Search Report and Written Opinion, dated Jul. 21, 2021, 16 pages.
International Application No. PCT/US2021/020440, Invitation to Pay Additional Fees and, Where Applicable, Protest Fee dated May 31, 2021, 10 pages.
International Application No. PCT/US2021/020440, International Preliminary Report on Patentability dated Sep. 22, 2022, 10 pages.

* cited by examiner

SKIMMING DEVICES AND RELATED METHODS

CROSS-REFERENCE TO RELATED APPLICATION

This application claims the benefit of and priority to U.S. Provisional Patent Application Ser. No. 62/987,158, filed Mar. 9, 2020, the entire contents of which are hereby incorporated herein by this reference.

FIELD OF THE INVENTION

This invention relates to cleaning devices for water-containing vessels such as swimming pools and spas and more particularly, although not necessarily exclusively, to devices for skimming debris from upper water surfaces of the vessels.

BACKGROUND OF THE INVENTION

Most swimming pools and spas include water-circulation systems comprising at least a filter and a pump. The pump may evacuate water from a vessel for filtration, treatment, or otherwise and then return the water to the vessel. Various types of filters are available for use in these circulation systems. One such filter, typically called a skimmer or skimming device, may function to filter debris from an upper water surface of a vessel.

Many conventional "suction-side" skimmers are installed at the normal waterline of the pool and connected to an inlet of the pump. When the pump is active, it tends to evacuate surface water and entrained debris from the pool. These skimmers usually include a basket or other filtration medium trapping much of the entrained debris therein while allowing water to pass to the pump.

Other skimmers are connected to an outlet of the pump. These devices utilize the Venturi principle, employing the pressurized water output by the pump to create a local low-pressure region. This local region evacuates nearby surface water from the pool together with entrained debris. These devices too usually include a filtration medium entrapping much of the entrained debris while allowing water to pass to return to the pool.

U.S. Pat. No. 6,086,759 to Bisseker illustrates one of these "pressure-side" skimmers. The skimmer includes a skim container, a mesh bag, and a hose connected to a return fitting of a pool (and thence to a pump outlet). Pressurized water from the return fitting flows through the hose, into a tapered nozzle of the skim container, and through the skim container into the attached mesh bag. A slot in the skim container at the waterline of the pool allows the low-pressure region created by the pressurized water flow to draw debris-laden water from the pool into the skim container, where it joins the flow of pressurized water into the mesh bag for filtering.

The Bisseker patent describes the skimmer to be "portable." This is because the skim container may include suction cups adhering it to a wall of a pool. Mentioned in the Bisseker patent as substitutes for suction cups are a bracket, floats, and weights.

DESCRIPTION OF THE INVENTION

The present invention provides enhanced alternatives to pressure-side skimmers such as that of the Bisseker patent. Multiple swivels may be present in skimming devices of the invention. Accordingly, the devices may be adjustable vertically (i.e. may raise and lower) to account for fluctuations in the waterline of a pool. Skimming heads of the devices additionally may be levelled relative to the water surface. Both adjustments improve the positioning of the skimming devices and thus enhance their functionality.

Skimmers of the present invention additionally may create "blades" of debris-laden pool water entering their heads. This thin, sheet-like water flow is only minimally turbulent, hence smoothly moving debris and water into the heads. Structure of, and within, a head also facilitates relatively uniform entry of water along a length of the head.

Figure 1:
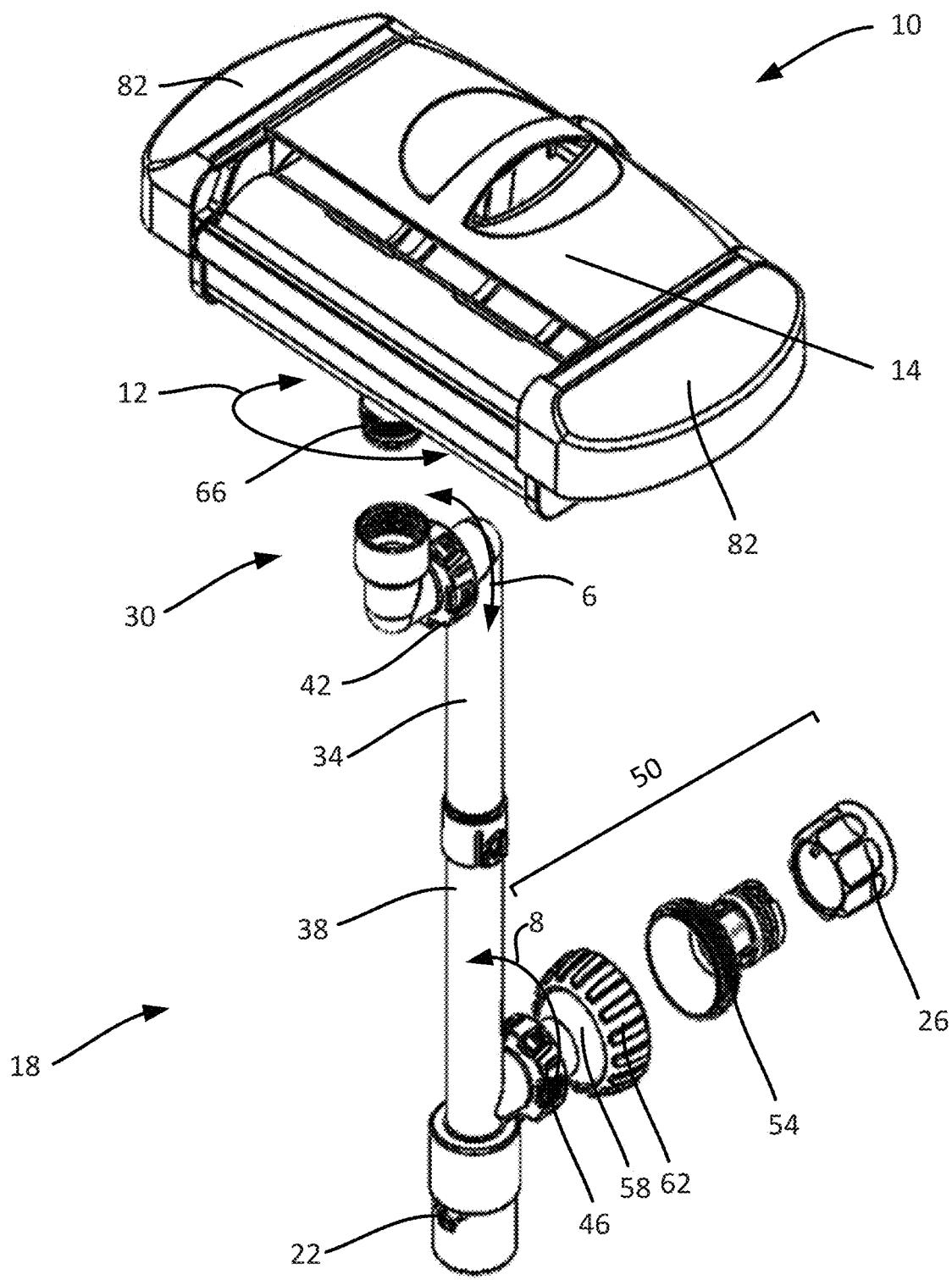
FIG. 1 illustrates an exploded view of an exemplary skimming device.
Figure 2:
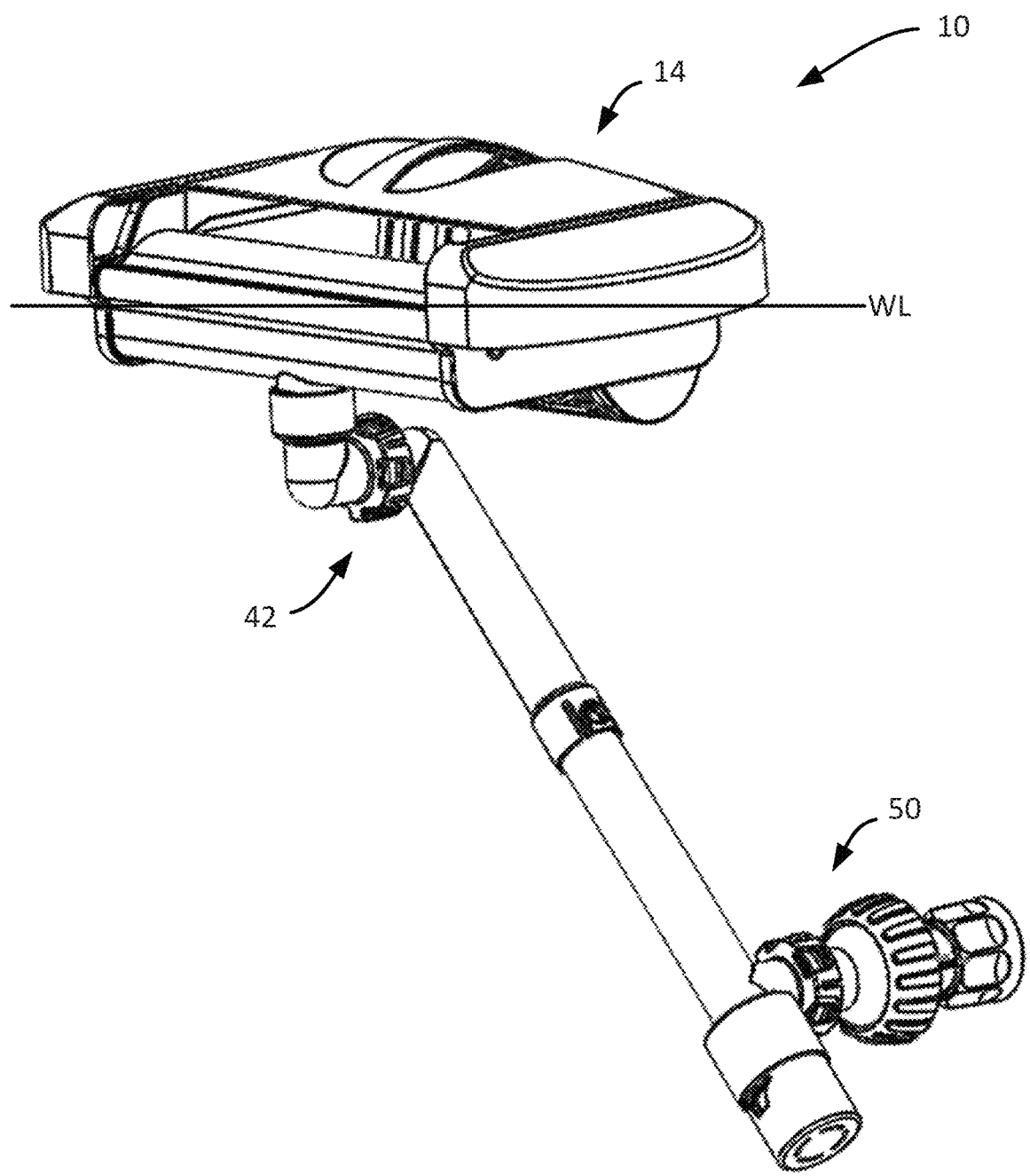
FIG. 2 illustrates a perspective view of the skimming device of FIG. 1.
Figure 3:
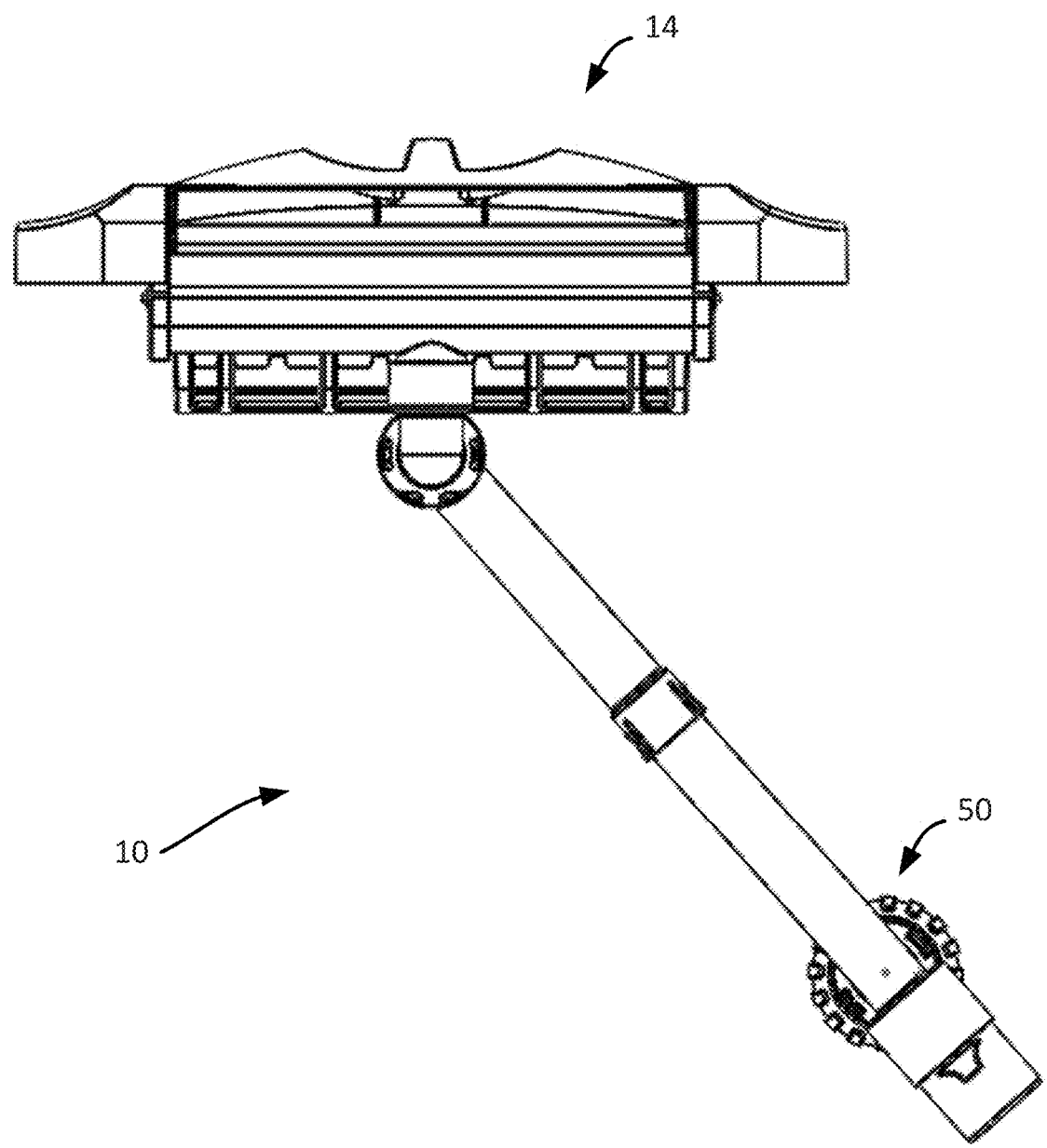
FIG. 3 illustrates a front view of the skimming device of FIG. 1.
Figure 4:
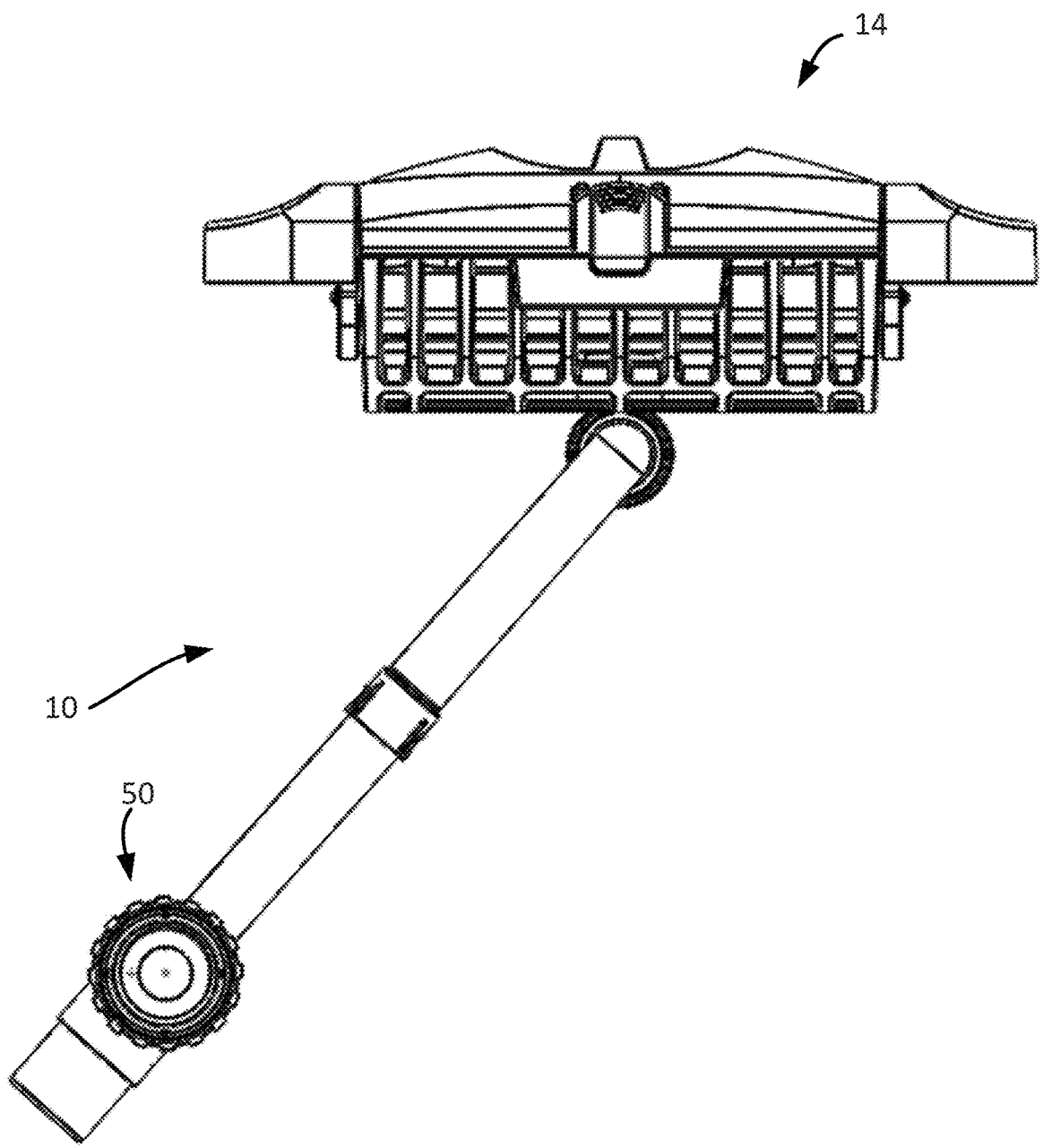
FIG. 4 illustrates a back view of the skimming device of FIG. 1.
Figure 5:
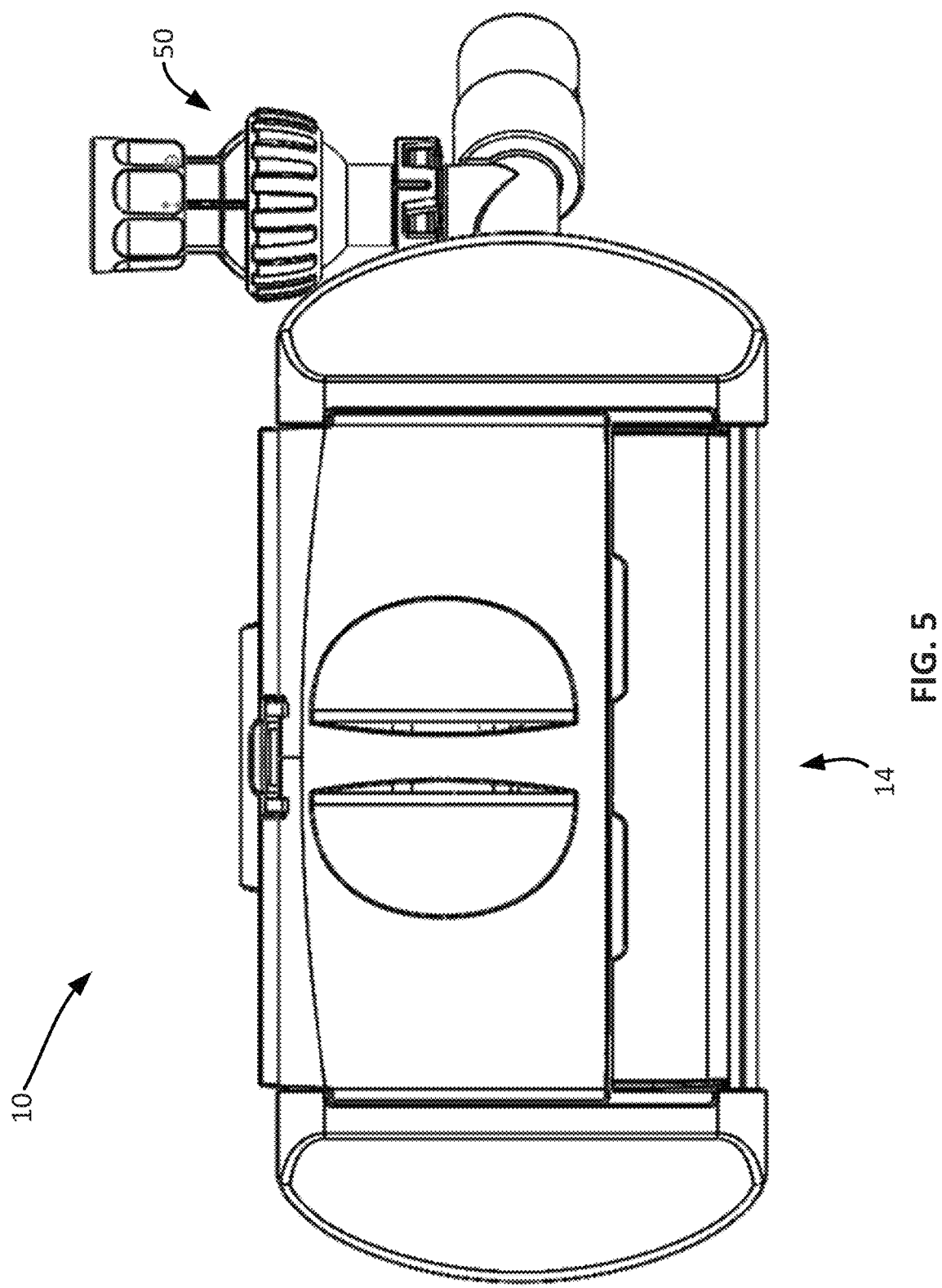
FIG. 5 illustrates a top view of the skimming device of FIG. 1.

FIG. 1 provides an exploded perspective view of a skimming device 10. Skimming device 10 may include head 14 and plumbing 18. A by-pass valve 22 may be optionally incorporated into plumbing 18.

Plumbing 18 provides a fluid connection so that pressurized water may flow to head 14 from an outlet of a pump. Most swimming pools contain one or more "return lines" terminating in fittings placed in walls of the pools. Plumbing 18 may connect to one of these return fittings if appropriate. Alternatively, a fitting may be removed and replaced with wall adapter 26. Yet alternatively, plumbing 18 may supply pressurized water to head 14 in other manners recognized by persons skilled in the art.

In the example depicted in FIG. 1, plumbing 18 includes elbow 30, upper pipe 34, and lower pipe 38. Plumbing 18 of FIG. 1 additionally includes first swivel 42, second swivel 46, and lockable ball joint 50. Ball joint 50, in turn, includes female end 54, male end 58, and threaded nut 62. Other examples may not include all of these components.

Upper pipe 34 and lower pipe 38 may be locked together at a fixed orientation. Head 14 is illustrated in FIG. 1 as having threaded connection 66, which may engage corresponding threads of elbow 30. This engagement may be adjustable up to 360°, as illustrated by arrow 12, and may be locked at any suitable position. The skimming device 10 can include means for adjusting a position of the head, such as means for raising and lowering the head 14, within the water of the pool. For example, the first swivel 42 can be a means for levelling the head 14 relative to an upper surface of the water, allowing the head 14 to swivel around a longitudinal axis of the first swivel 42, as illustrated by arrow 6, once the elbow 30 is engaged with the threaded connection 66. Additionally or alternatively, the means for levelling the head 14 relative to an upper surface of the water may be float assemblies 82 of the head 14 that can keep the head 14 level relative to the waterline. Raising and lowering the head 14 can be achieved by adjusting the upper pipe 34 and the lower pipe 38 relative to each other and then locking them in place.

FIGS. 2-5 illustrate various views of skimming device 10. Lockable ball joint 50 may accommodate misalignment of a return line in multiple dimensions. At least first swivel 42 may permit head 14 to remain level relative to the upper water surface, following the waterline WL regardless of fluctuation, as first swivel 42 permits elbow 30 (and thus head 14) to rotate relative to upper pipe 34 and/or lower pipe 38. In at least some embodiments of skimming device 10, and as illustrated by arrow 8, ball joint 50 and second swivel 46 may rotate or be otherwise adjusted to account for misalignments of the return line up to ±30° off center both horizontally and vertically. To orient skimming device 10 optimally, a necessary angle of male end 58 can be determined and the male end 58 can be locked into that position by securing nut 62.

Figure 6:
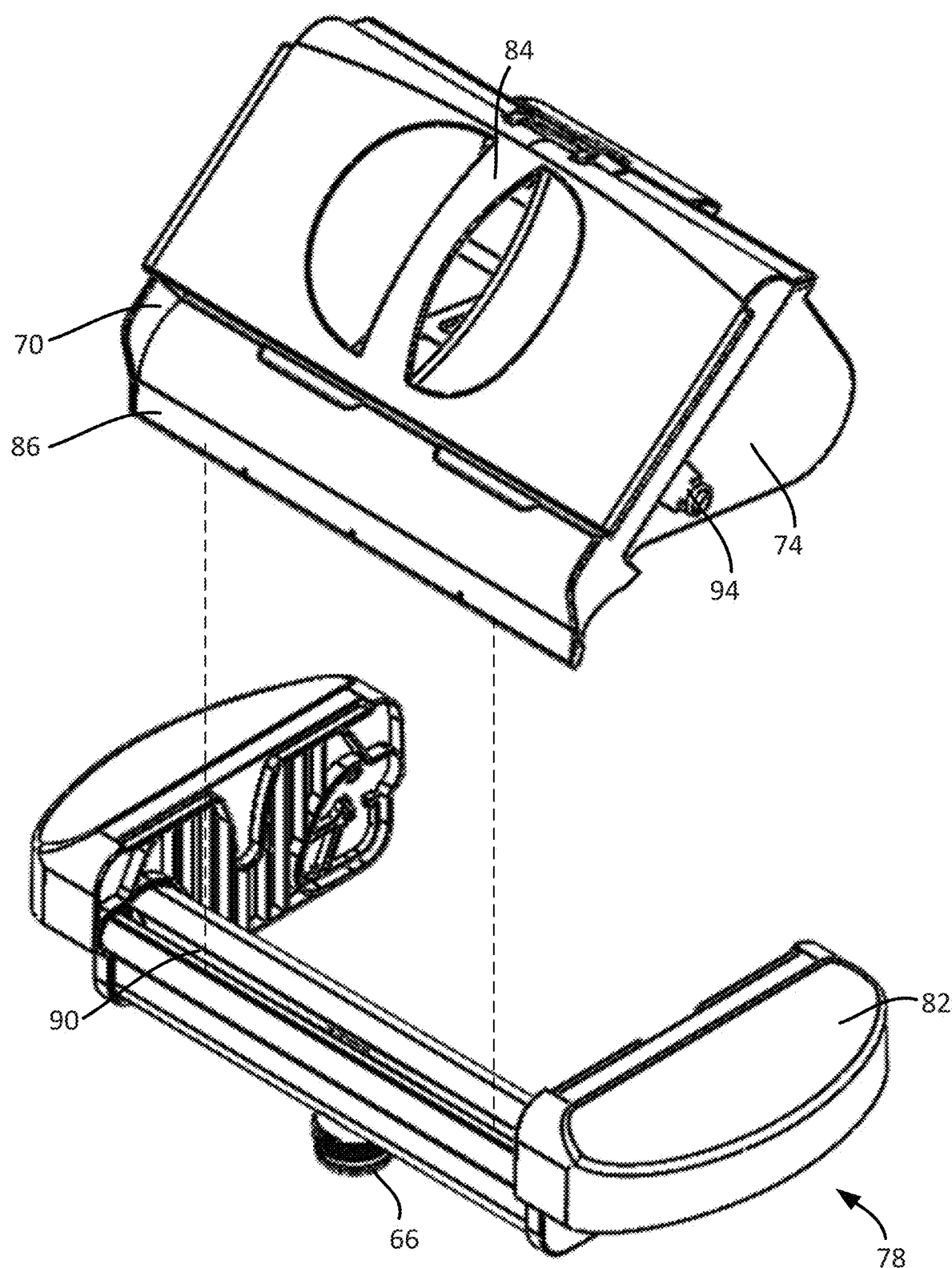
FIG. 6 illustrates an exploded view of a head of the skimming device of FIG.

FIGS. 6-14 especially illustrate aspects of head 14 of skimming device 10. Head 14 advantageously comprises lid 70, filter 74, and nozzle assembly 78. Lid 70 and filter 74 may be fitted together for use if desired, with filter 74 being a canister assembly removable from lid 70 for emptying debris, for example. Nozzle assembly 78 includes threaded connection 66 and is designed to be buoyant in water so as to float at the waterline. As shown in FIG. 6, nozzle assembly 78 may include one or more float assemblies 82 on its sides. Float assemblies 82 preferably include floats made of closed cell foam, although they may be constructed or located differently than as shown, however.

Figure 7:
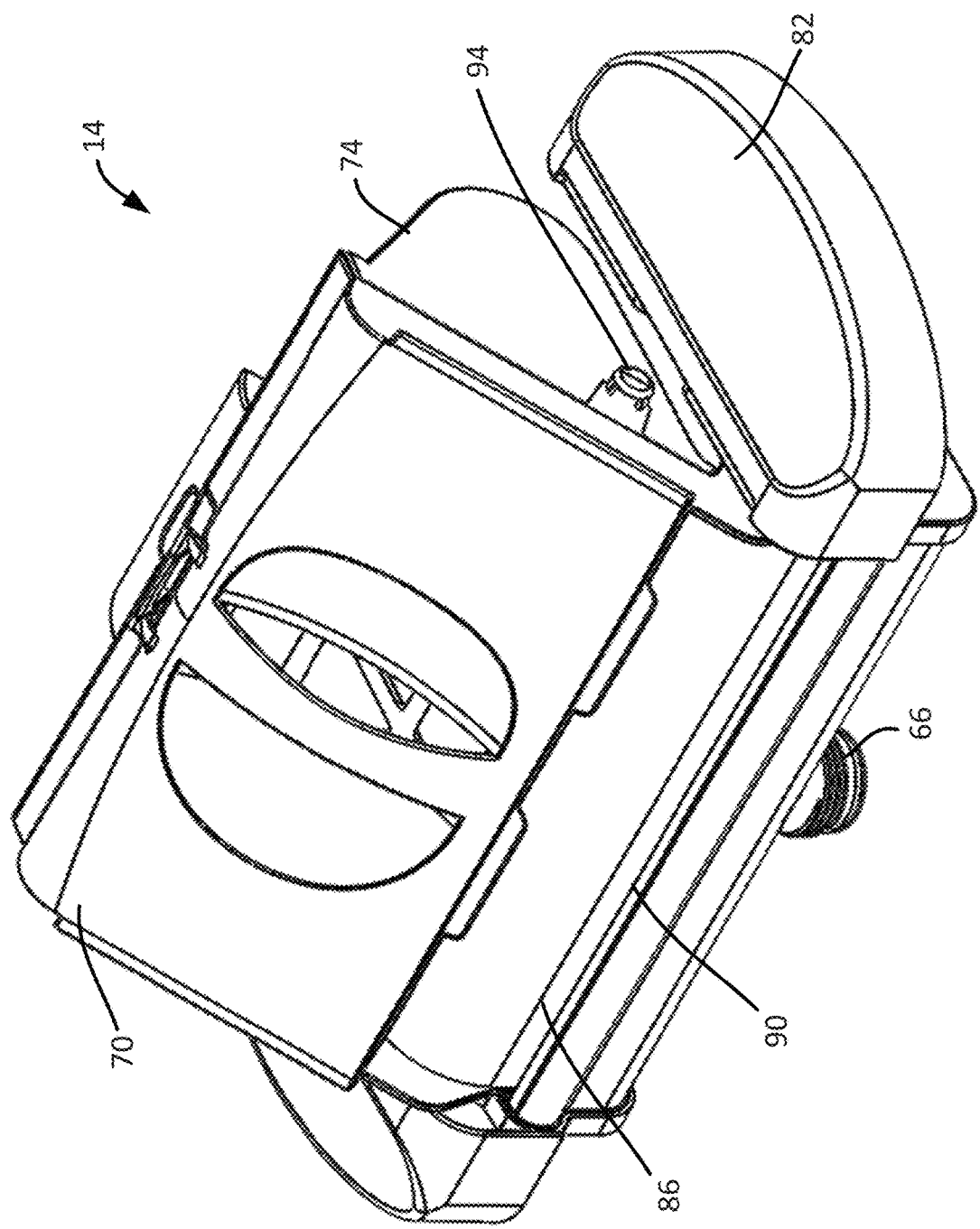
FIG. 7 illustrates another view of the head of FIG. 6.
Figure 8:
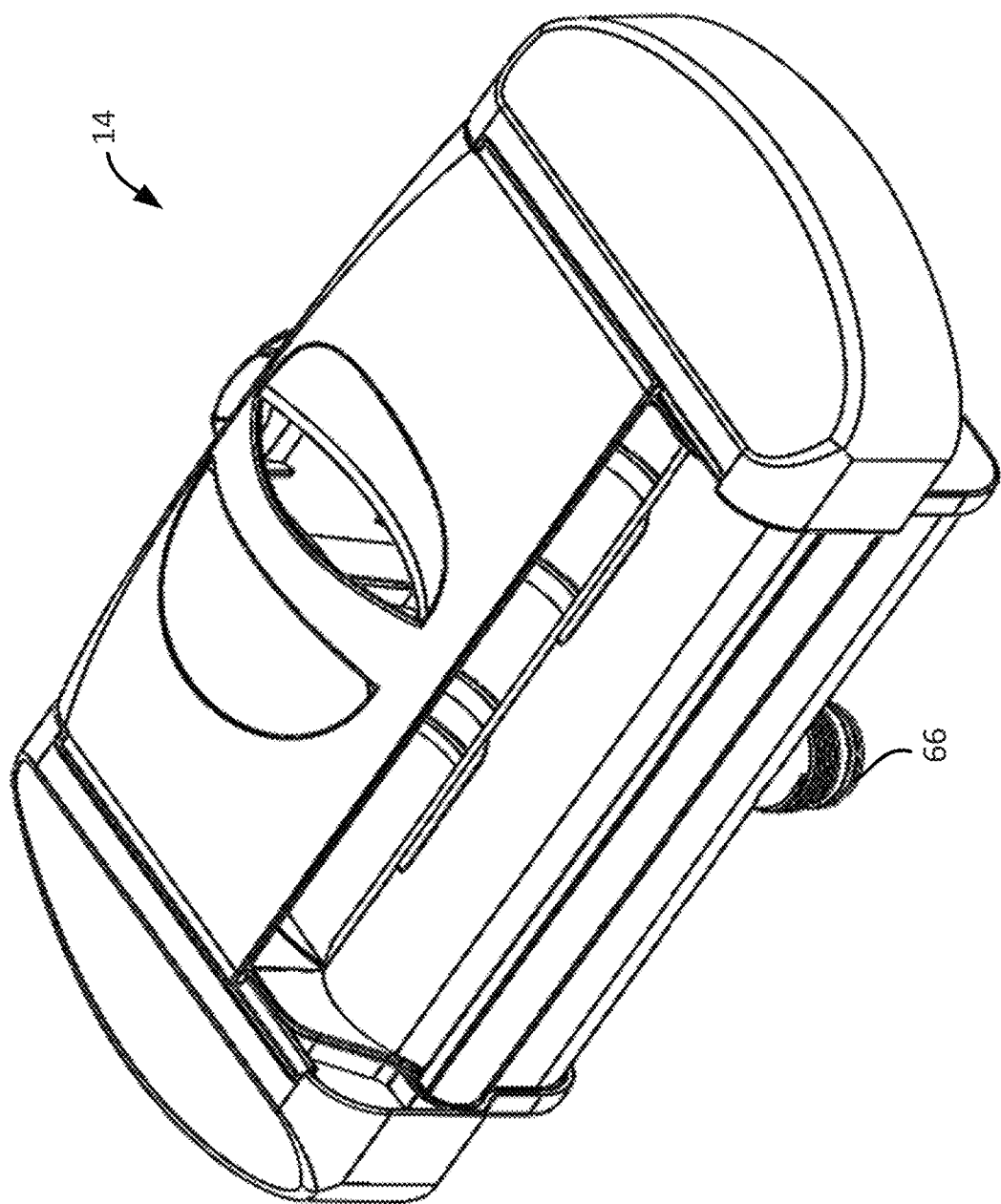
FIG. 8 illustrates another view of the head of FIG. 6.
Figure 9:
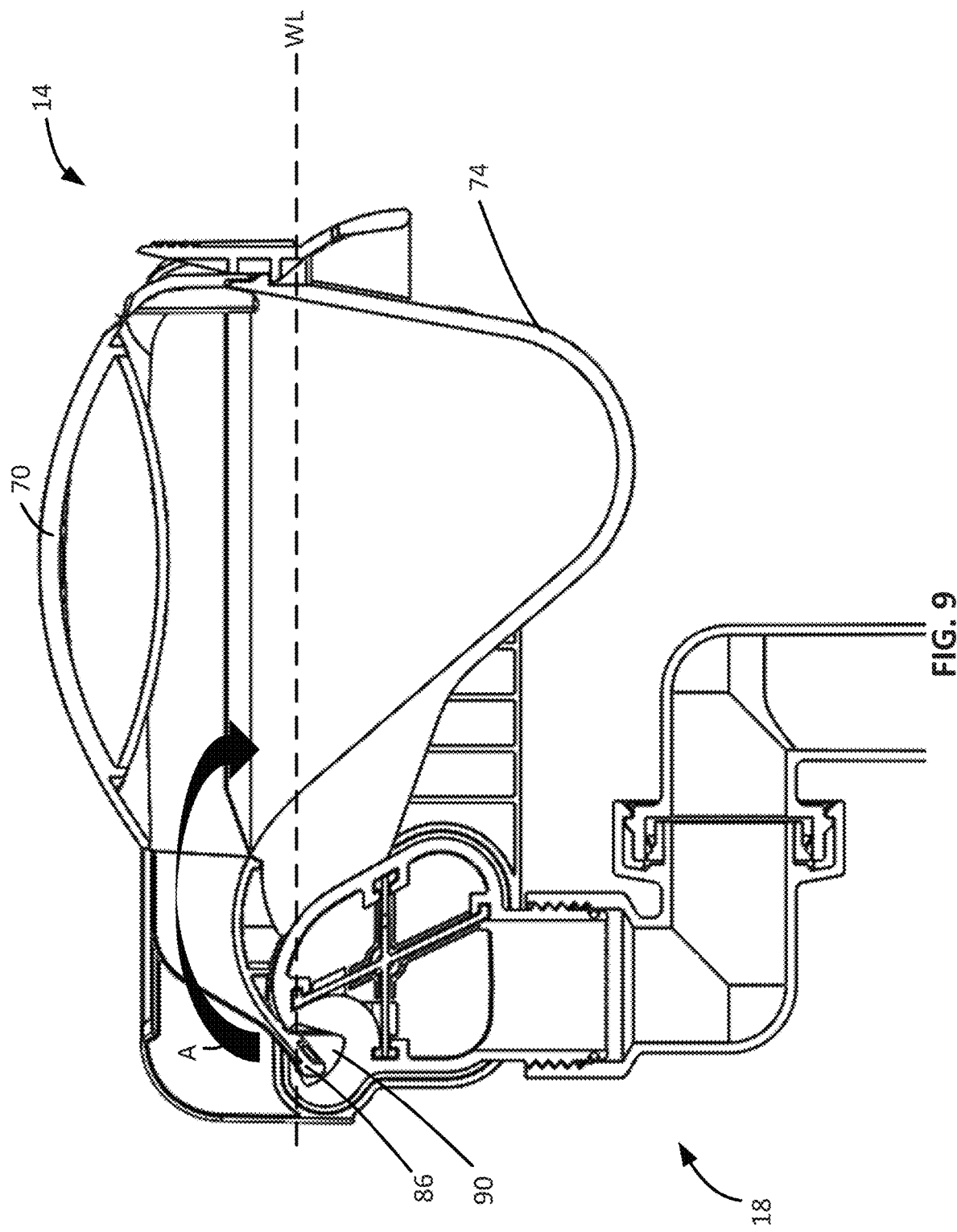
FIG. 9 illustrates a section view of a portion of the skimming device of FIG. 1.

Fitted lid 70 and filter 74 may be attached to nozzle assembly 78. This attachment may occur in any suitable manner, including as depicted in FIGS. 6-8, and may be facilitated by handle 84 of lid 70. Beneficially, leading edge 86 of lid 70 inserts into channel 90 of nozzle assembly 78, as shown especially in FIG. 7. Also depicted in FIGS. 6-7 are exemplary alignment features 94 preferably positioned on each side of filter 74 and which are configured to engage nozzle assembly 78 to promote proper installation of lid 70 and filter 74 into nozzle assembly 78. As fitted lid 70 and filter 74 are rotated so as to position leading edge 86 adjacent channel 90, alignment features 94 correctly force leading edge 86 into channel 90.

Pressurized water may flow through means for receiving pressurized water, such as plumbing 18 and threaded connection 66, into channel 90. Channel 90 may be a means for causing the pressurized water to flow over the leading edge 86. If leading edge 86 of lid 70 is not inserted into the channel 90 (see, e.g., FIG. 6), the volume of channel 90 is sufficiently large so that no "blade" of water is formed, and instead the pressurized water merely churns at the pool waterline. By contrast, when leading edge 86 is properly inserted into channel 90, the pressurized water flows along leading edge 86 into filter 74 as illustrated by arrow A of FIG. 9. This flow forms a thin "blade" of pressurized water entering filter 74 entraining pool water and debris at the water line WL to enter the filter 74 as well. Leading edge 86 thus may function similar to a wing or foil. And because a majority of leading edge 86 preferably rests slightly above the waterline, no debris is able to easily flow back out of filter 74 should pressurized water cease flowing to head 14.

Figure 10:
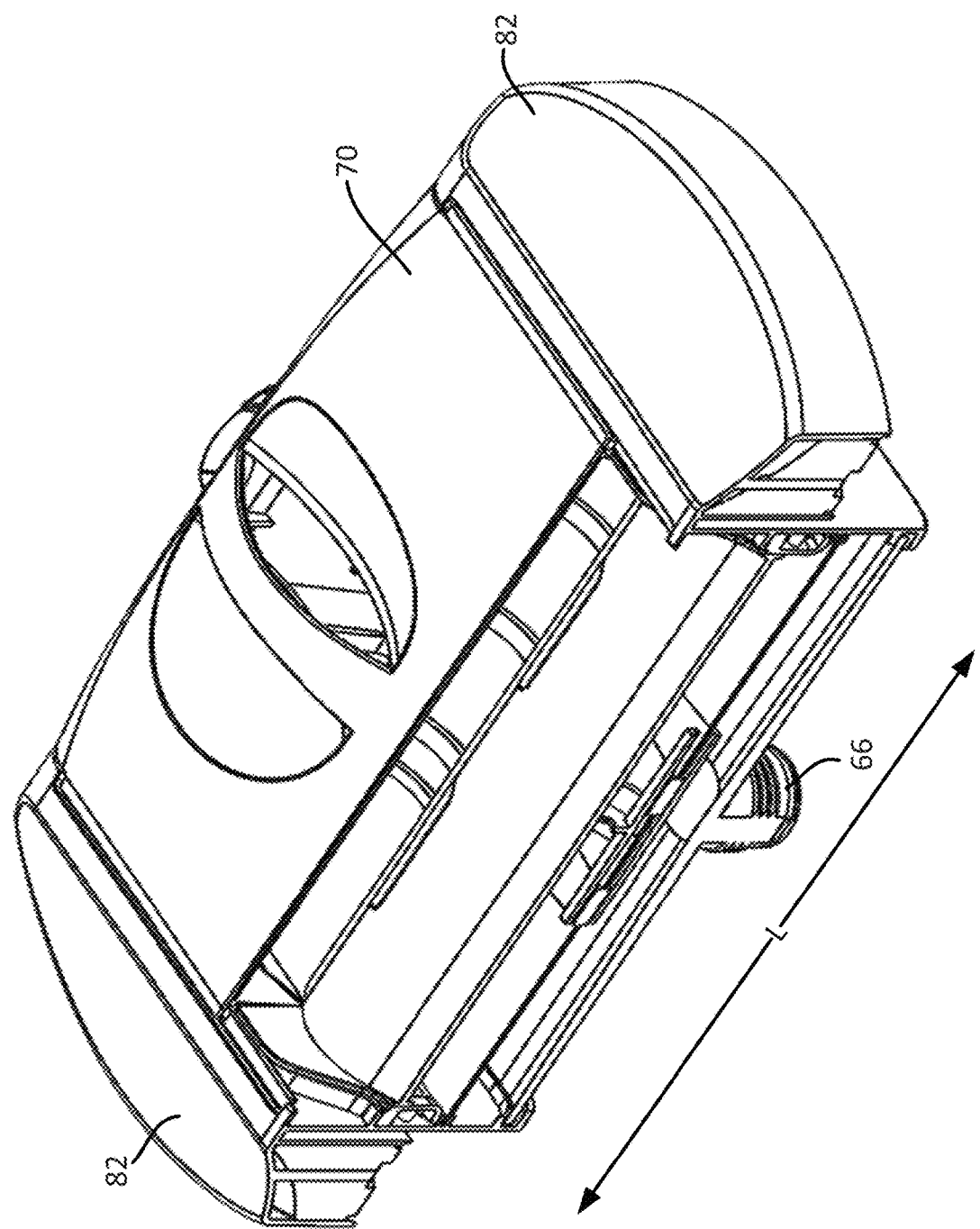
FIG. 10 illustrates a section view of the head of FIG. 6.
Figure 11:
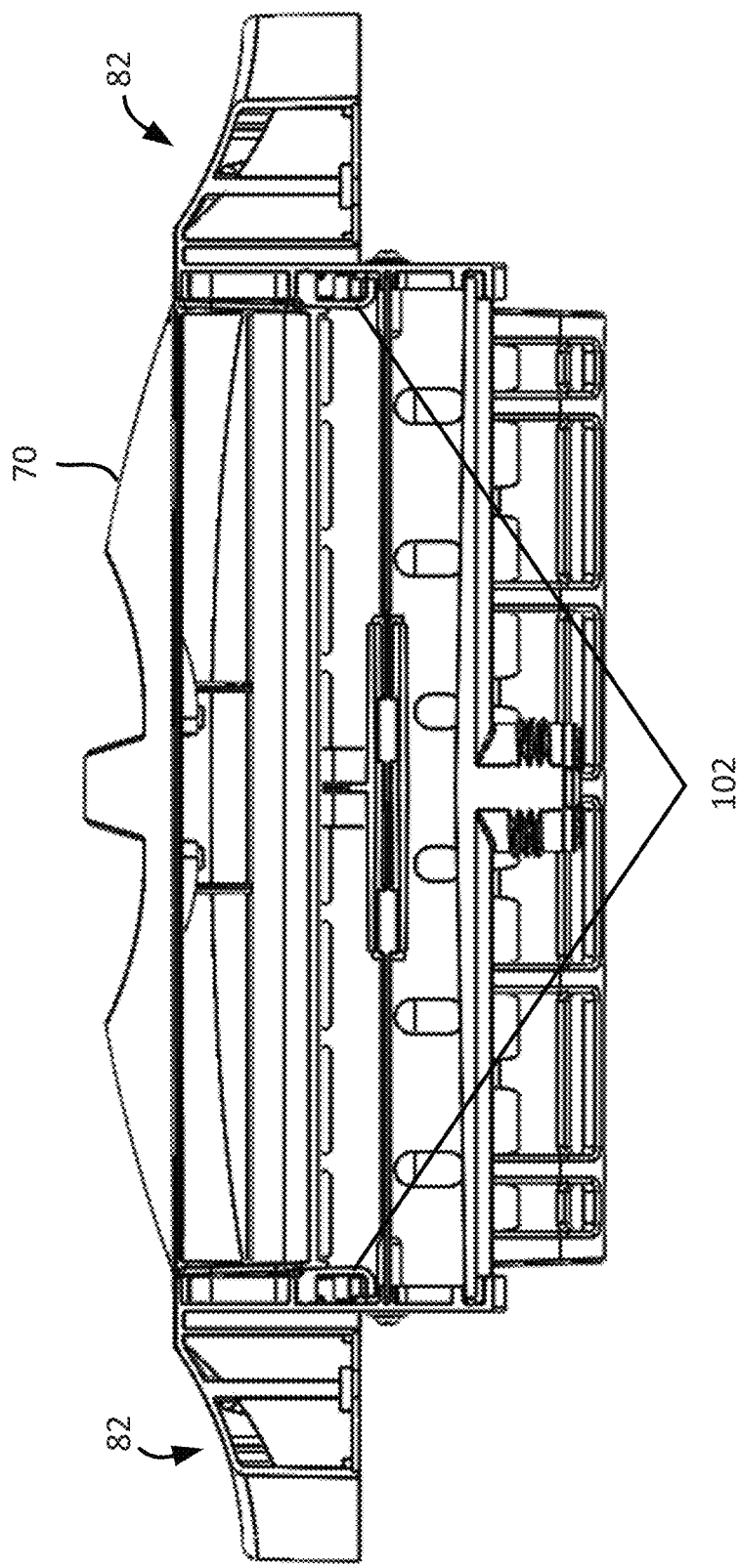
FIG. 11 illustrates an exemplary filter of the head of FIG. 6.
Figure 12:
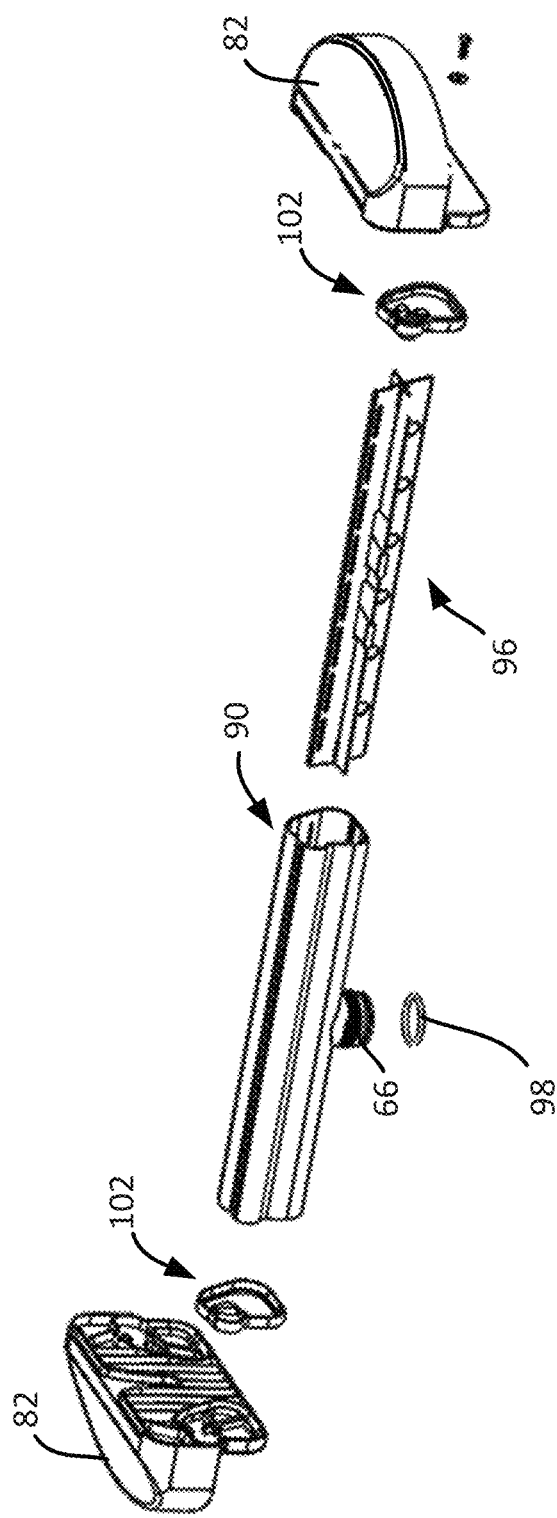
FIG. 12 illustrates an exploded view of the head of FIG. 6.
Figure 13:
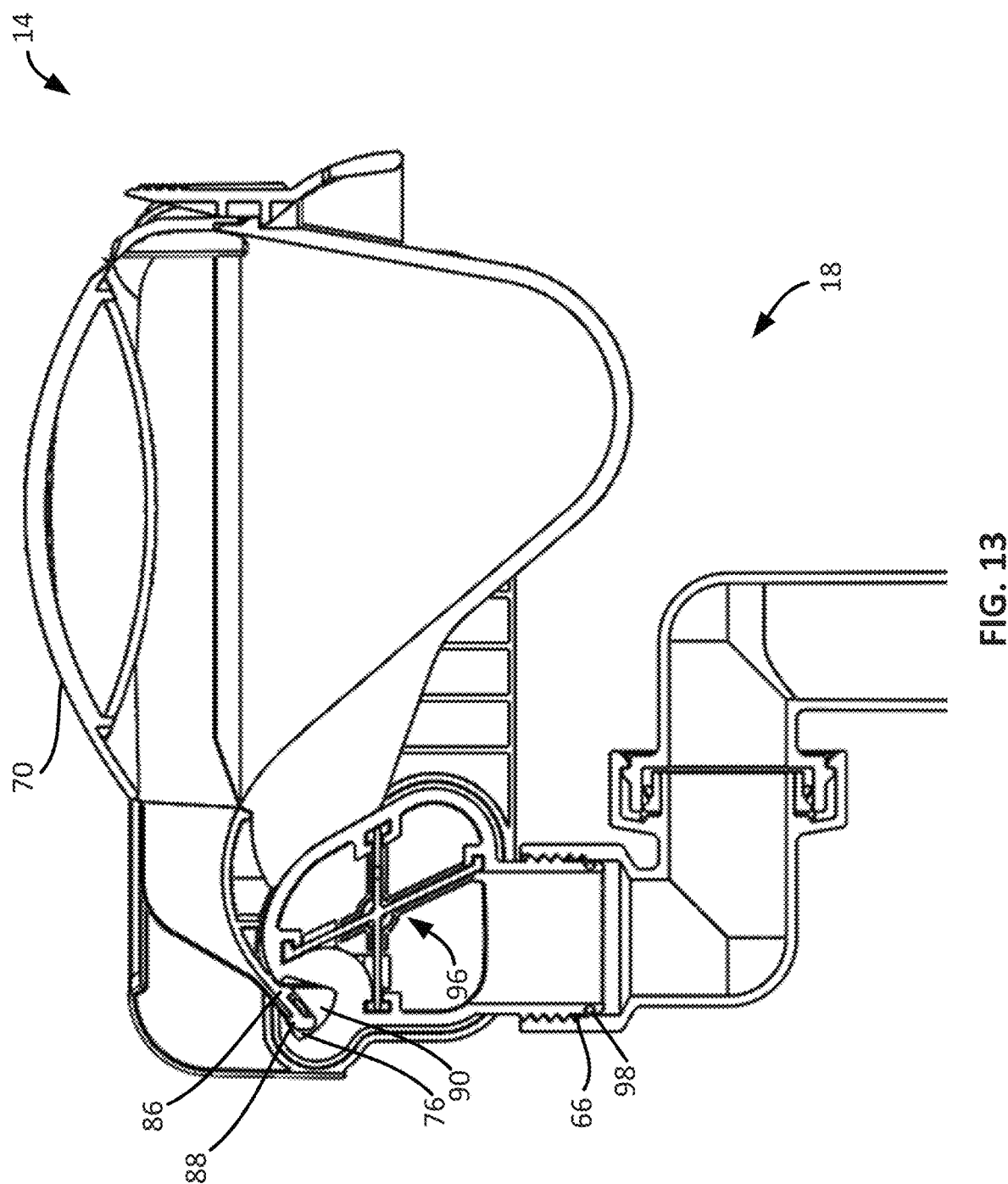
FIG. 13 illustrates another section view of a portion of the skimming device of FIG. 1.

FIGS. 10-13 depict structures associated with channel 90 of nozzle assembly 78. Apparent from the drawings is that channel 90 advantageously may be elongated, spanning at least most of length L of nozzle assembly 78. Equally apparent from FIG. 10 is that threaded connection 66, which forms the inlet of nozzle assembly 78 for pressurized water, preferably (although not necessarily) is centrally located along length L. In such cases, internal baffle 96 may be useful in distributing the pressurized water more uniformly in channel 90. As illustrated in FIGS. 12-13, baffle 96 may have a generally X-shaped cross-section, functioning to spread the pressurized water away from the central portion of the channel 90. FIG. 13 illustrates formation of a nozzle 76 by channel 90 and leading edge 86 of lid 70. Standoffs 88 may exist on leading edge 86 to prevent the leading edge 86 from collapsing and thereby maintain a gap in channel 90.

Also shown in the exploded view of FIG. 12 are O-ring 98 and inner seals 102. O-ring 98, if present, may help seal the connection between threaded connection 66 and elbow 30. O-ring 98 also may provide friction to prevent an unintended rotation between threaded connection 66 and elbow 30. Inner seals 102, if present, may facilitate sealing of channel 90 to float assemblies 82. Inner seals 102 may be made of an elastomer or any suitable material.

Figure 14:
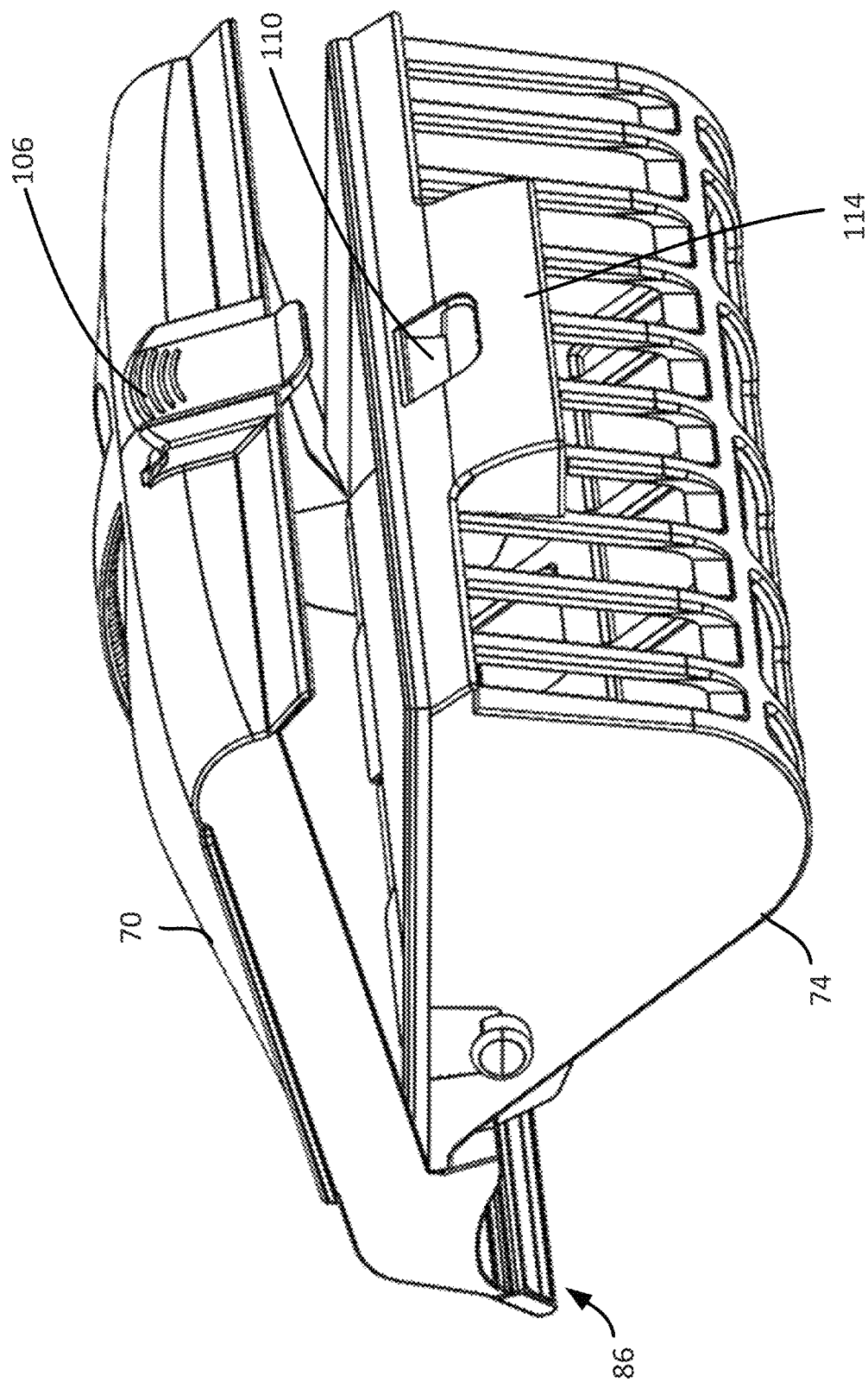
FIG. 14 illustrates another perspective view of the head of FIG. 6.
Figure 15:
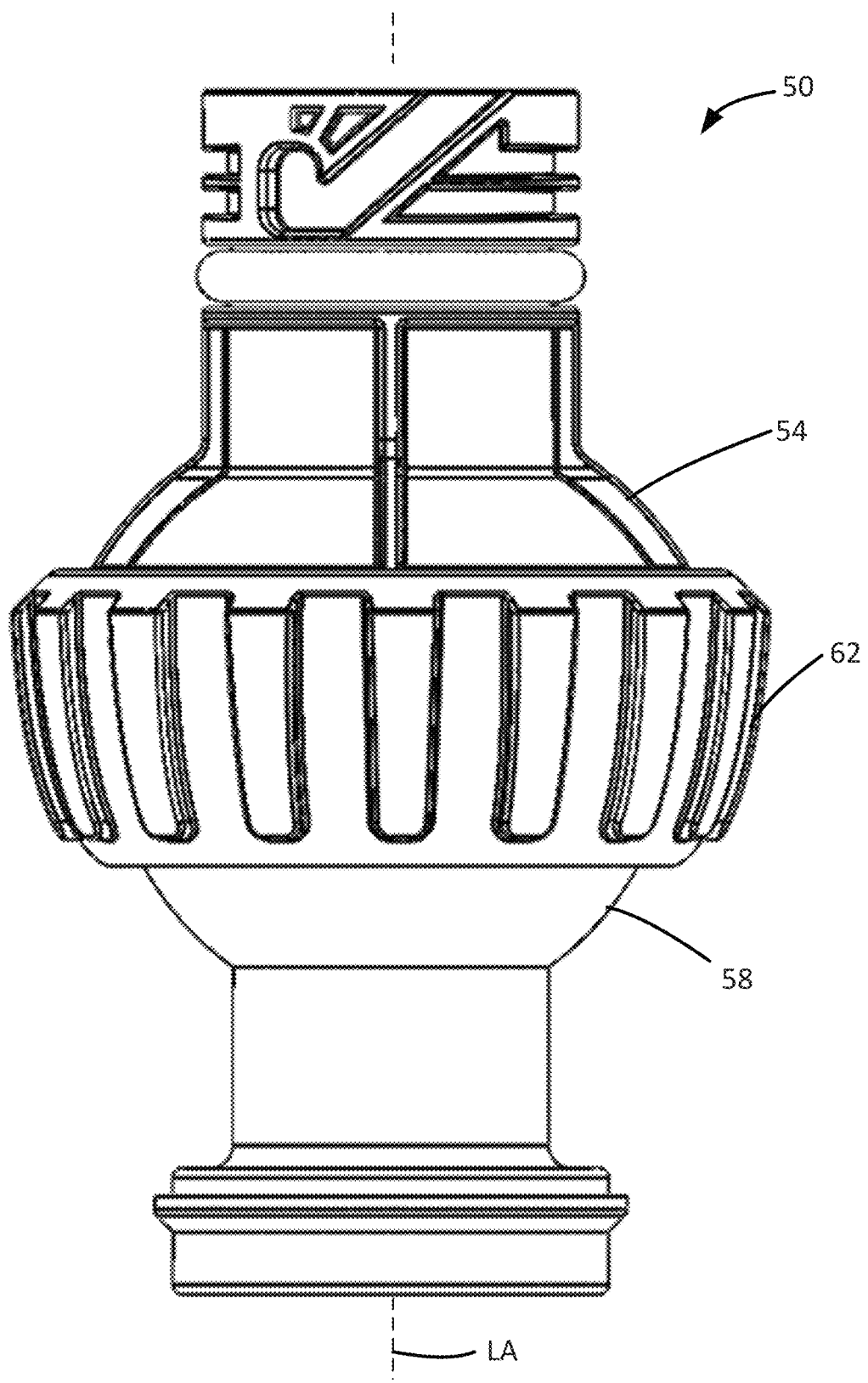
FIG. 15 illustrates an exemplary view of the ball joint of the skimming device of FIG. 1.

As shown in FIG. 14, some examples of lid 70 of skimming device 10 may include clip 106 configured to engage corresponding recess 110 of filter 74. Clip 106 advantageously may be positioned opposite leading edge 86, at the nominal rear of lid 70. Filter 74 may form an interior region bounded by a mesh screen configured to trap most debris within the interior region while allowing water typically to pass through its mesh. The mesh screen may be overmolded onto a frame to form filter 74, although other methods of attaching a mesh screen to a frame may be employed instead. FIG. 14 additionally shows filter 74 as including (optional) handle 114.

Figure 16:
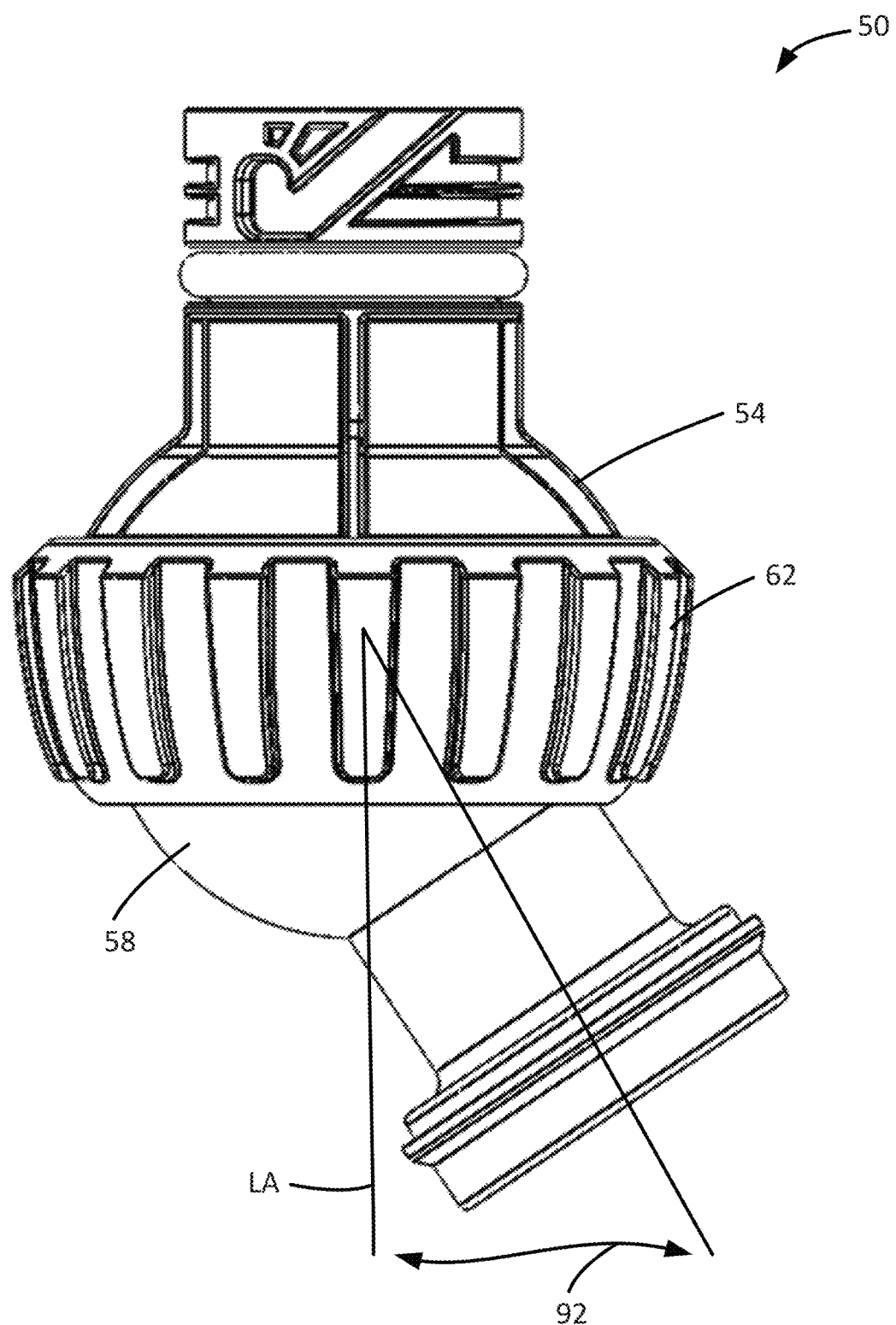
FIG. 16 illustrates another view of the ball joint of FIG. 15.
Figure 17:
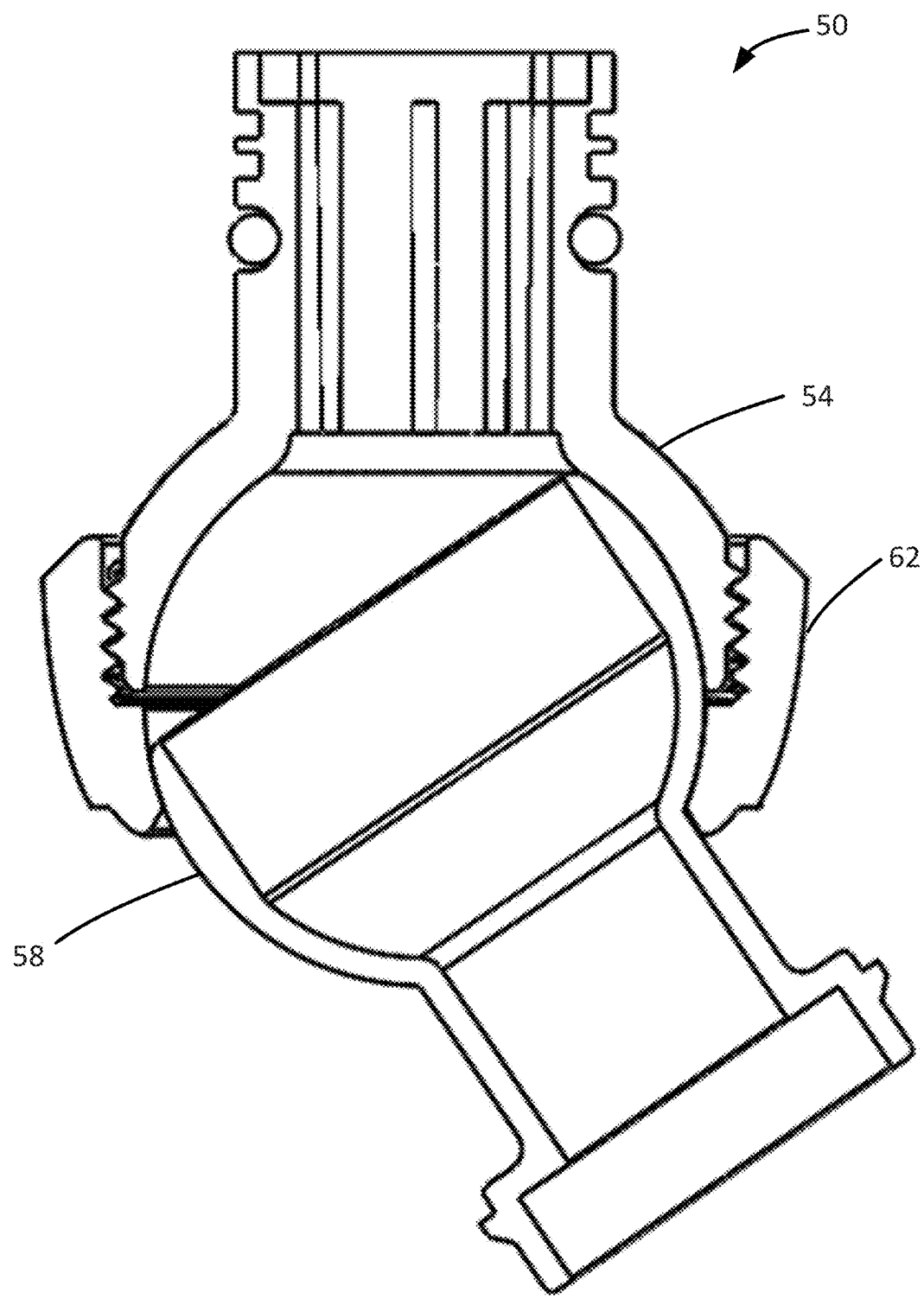
FIG. 17 illustrates a section view of the ball joint of FIG. 15.
Figure 18:
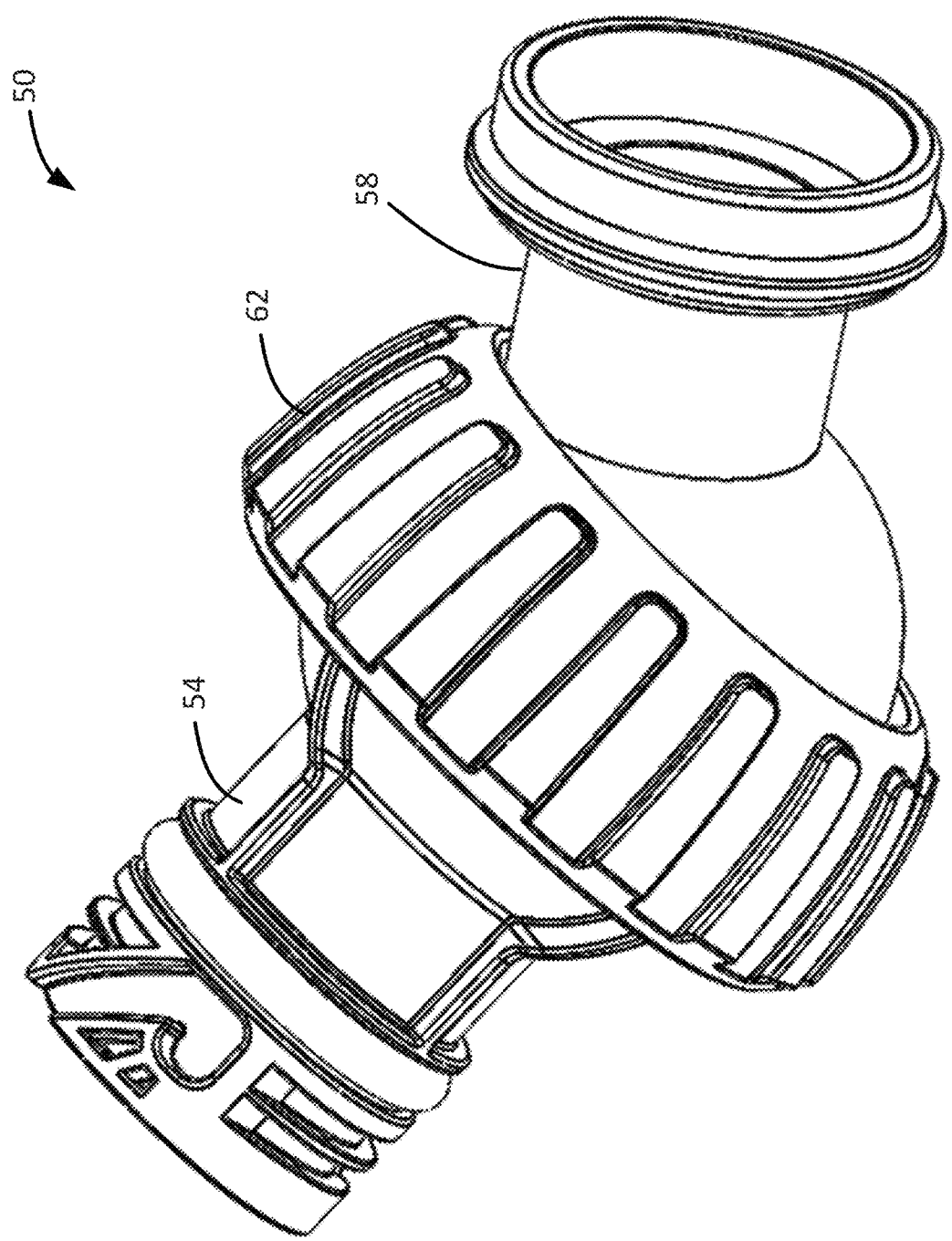
FIG. 18 illustrates another view of the ball joint of FIG. 15.

Illustrated in FIGS. 15-18 are components of ball joint 50. As noted above, ball joint 50 may comprise female end 54 forming an inlet thereof and male end 58 forming an outlet thereof, with longitudinal axis LA extending through the center of the ball joint 50. FIGS. 16-18 depict movement of male end 58 through arcs of up to approximately +30° off longitudinal axis LA, as illustrated by arrow 92. In use, female end 54 may be fastened to a return line of the pool. A user or installer may then determine the necessary angle of male end 58 to orient skimming device 10 optimally and thereafter lock male end 58 into that position by securing nut 62.

Figure 19:
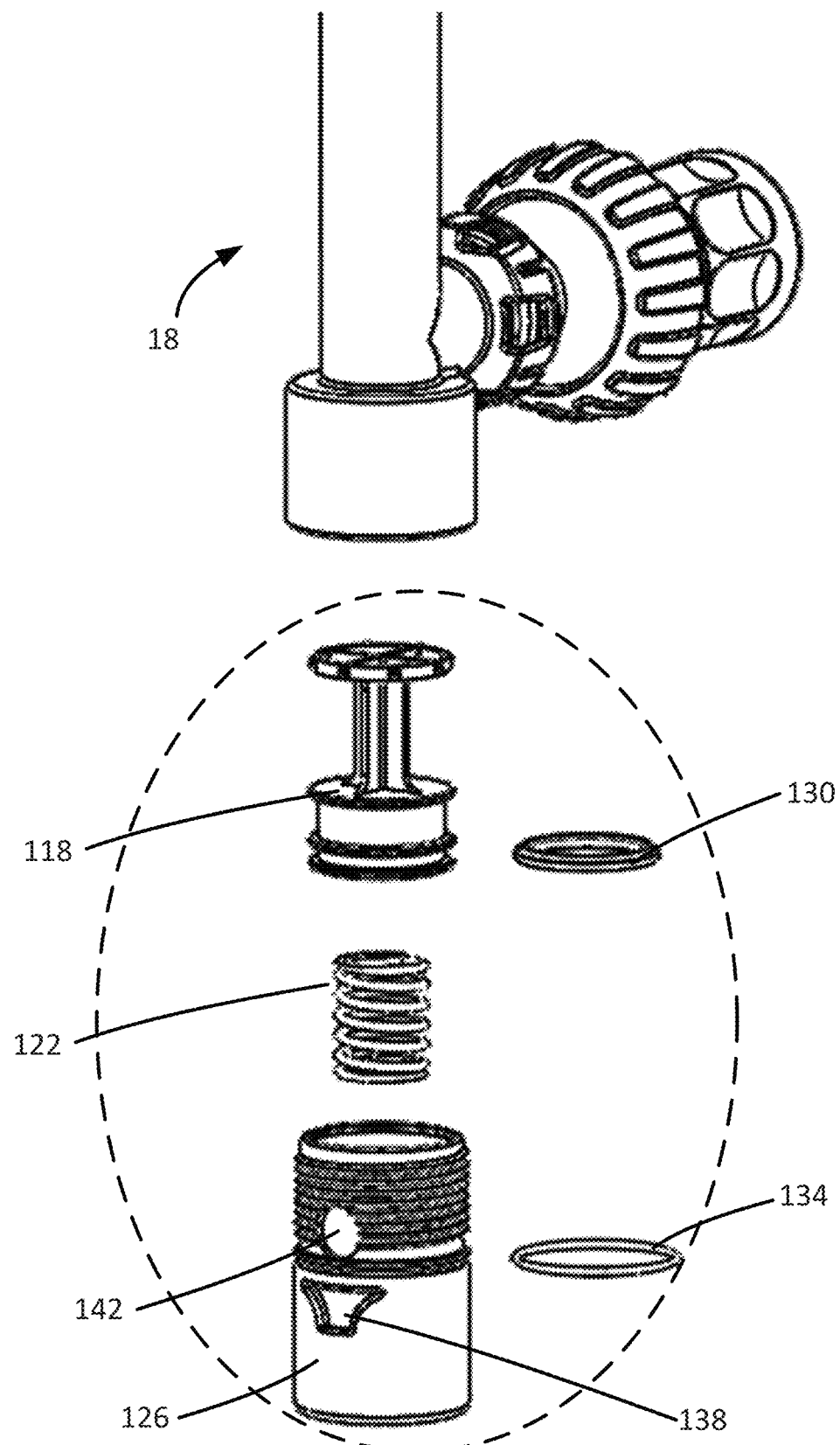
FIG. 19 illustrates an exploded view of an exemplary by-pass valve of the skimming device of FIG. 1.
Figure 20:
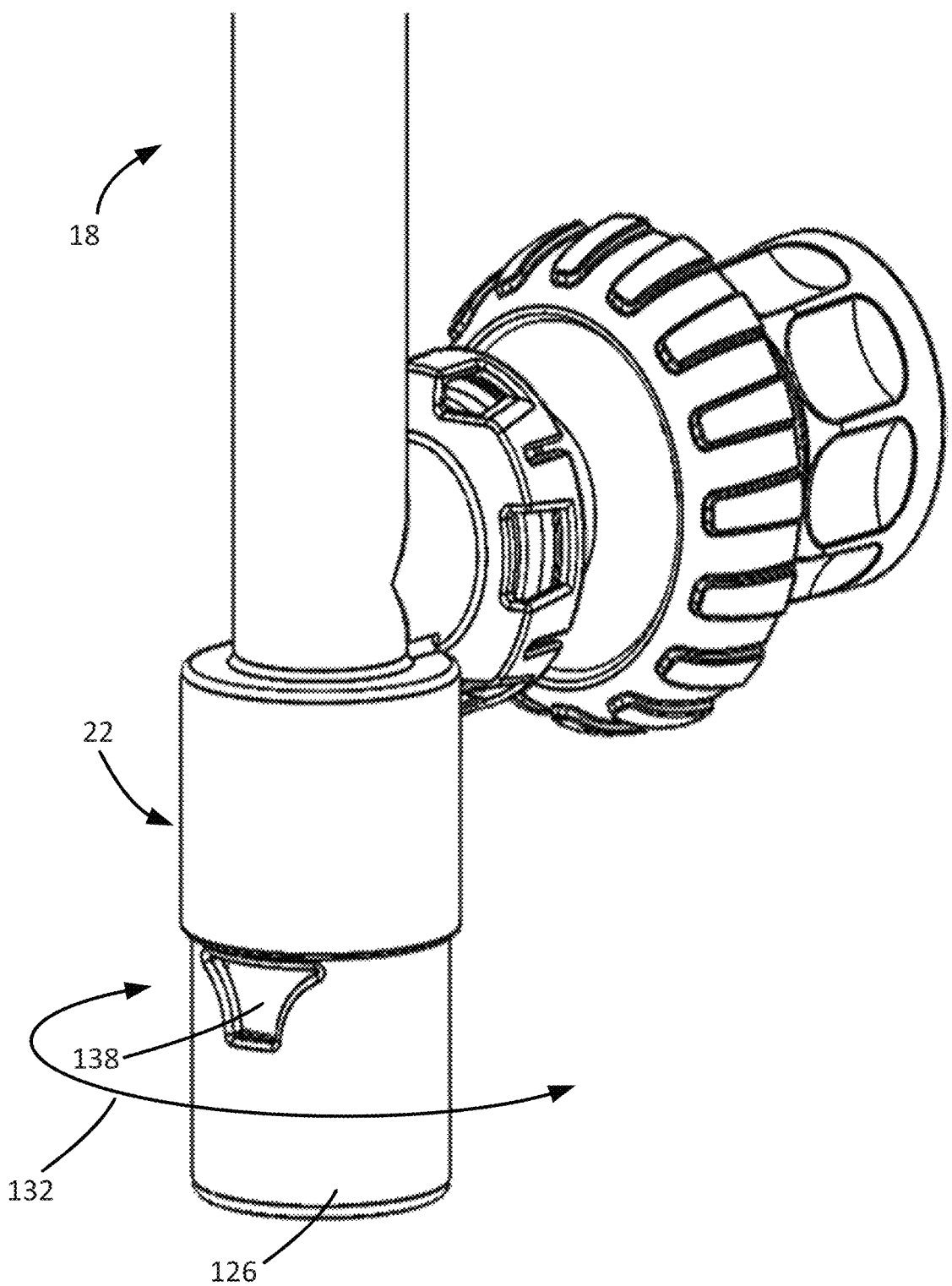
FIG. 20 illustrates a perspective view of the by-pass valve of FIG. 19.
Figure 21:
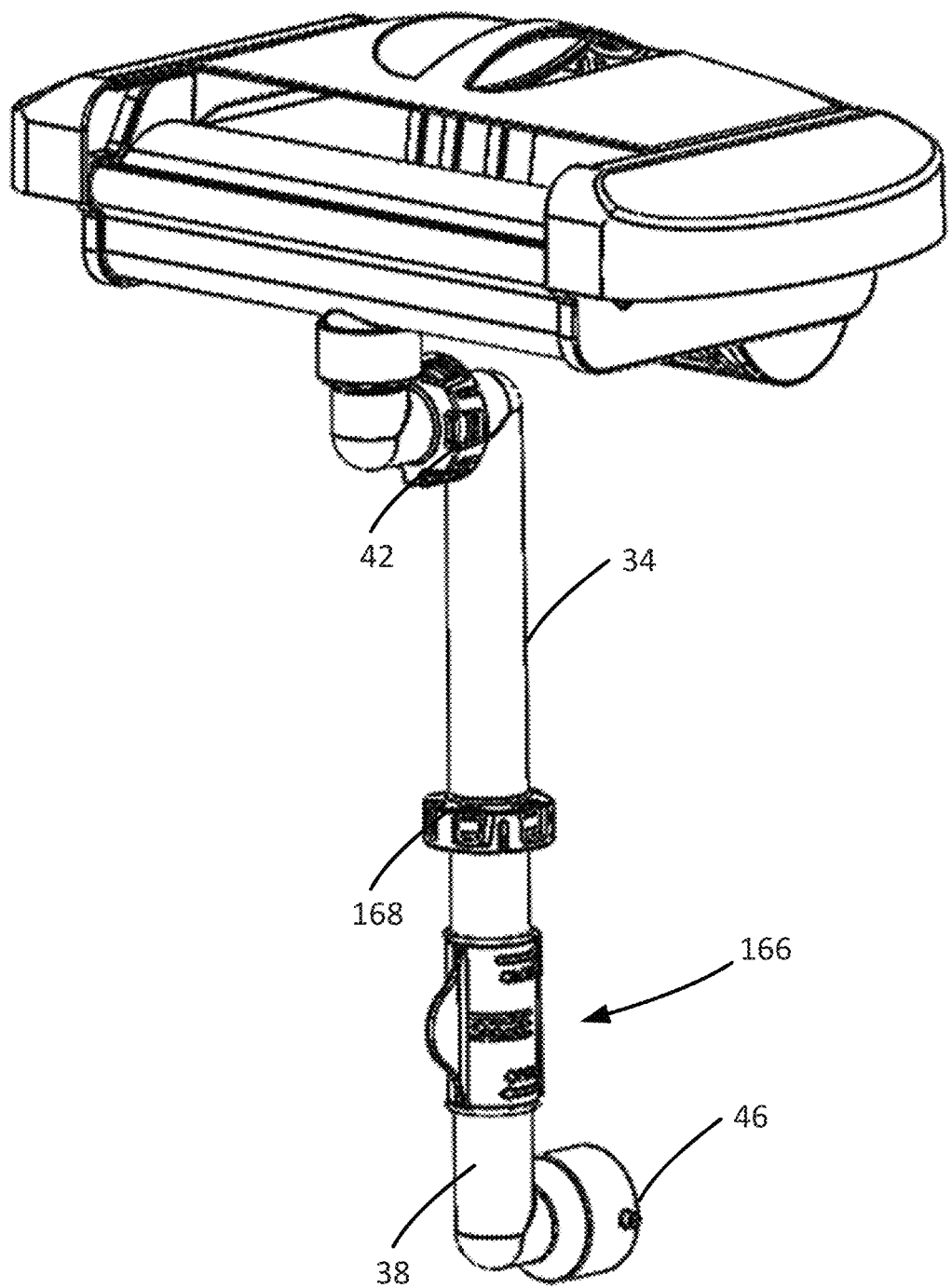
FIG. 21 illustrates a perspective view of another exemplary skimming device.

FIGS. 19-21 illustrate aspects of a sample by-pass valve 22. By-pass valve 22, if present, may be constructed in any suitable manner. For example, FIG. 19, shows by-pass valve 22 as including plunger 118, spring 122, body 126, plunger seal 130, and O-ring 134. FIG. 21, by contrast, shows by-pass valve 22 with an opening in plumbing 18 that can be exposed or covered by adjustable door 166. FIG. 21 additionally includes a third swivel 168 between the first swivel 42 and the second swivel 46. The third swivel 168 can allow the upper pipe 34 to rotate or be otherwise adjusted relative to the lower pipe 38.

Referring to FIG. 19, body 126 may screw into or otherwise attach to plumbing 18. The body 126 additionally may include by-pass flow window 138 through which pressurized water may flow at times when needed to relieve pressure in skimming device 10. By-pass flow window 138 normally is closed by the spring-loaded plunger 118, opening when the local pressure exceeds the force provided by spring 122. If desired body 126 may include second by-pass window 142, which can be accessed manually by partially unscrewing body 126 from plumbing 18. As illustrated by arrow 132 in FIG. 20, body 126 may be manually rotated relative to plumbing 18 to reorient by-pass flow window 138, thus allowing the by-pass water to flow in any desired direction through 360°.

Figure 22:
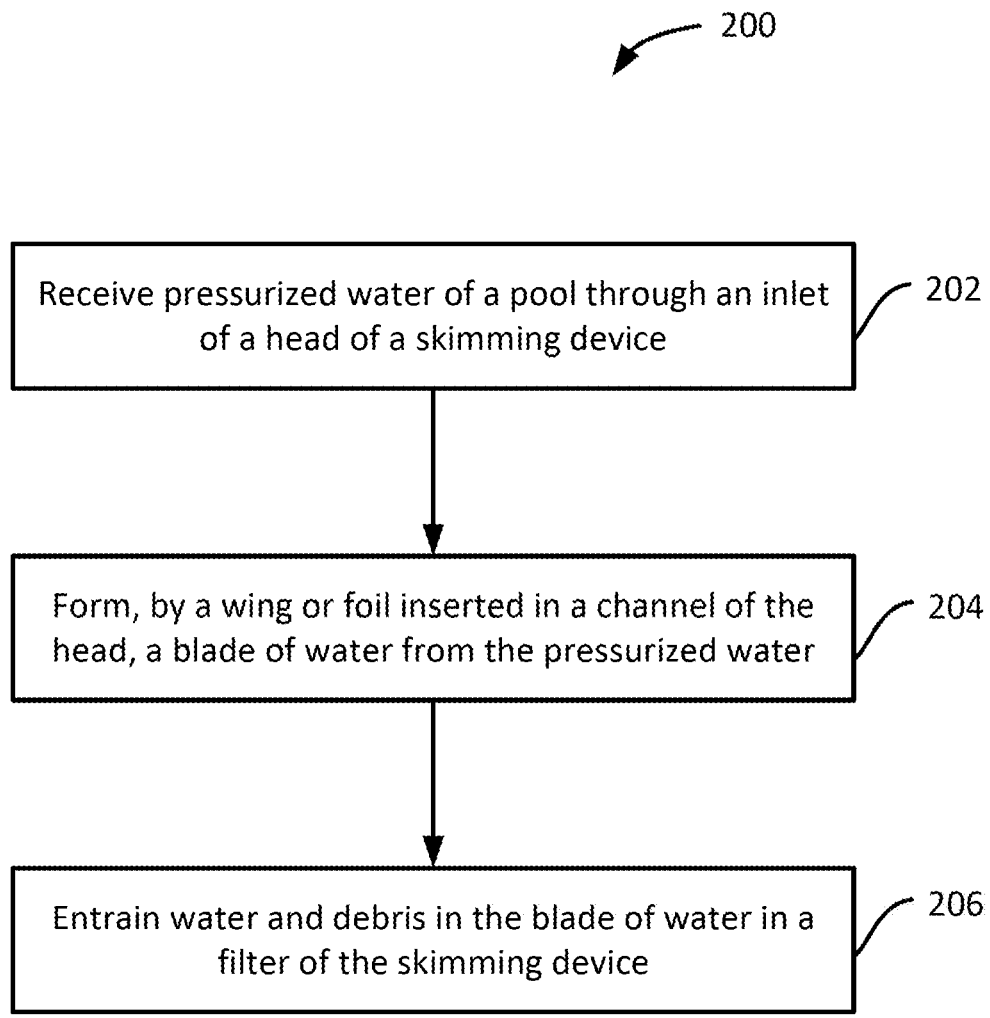
FIG. 22 illustrates an example of a process of skimming debris from water using a skimming device.

FIG. 22 illustrates an example of a process 200 of skimming debris from water using a skimming device, such as skimming device 10. At block 202, pressurized water of a pool can be received through an inlet of a head of a skimming device. The inlet may be a threaded connection (e.g., threaded connection 66) that connects the head to plumbing and a pump. The head can be buoyant and may be adjusted to remain level relative to an upper surface of the water of the pool.

At block 204, a "blade" of water can be formed from the pressurized water. The "blade" of water may be formed by a wing or foil (e.g., leading edge 86) that is inserted into a channel of the head. The pressurized water may flow over the wing or foil to form the "blade" of water. A majority of the wing or foil can rest slightly above the waterline of the pool.

At block 206, water and debris in the "blade" of water can be entrained in a filter of the skimming device. Since the majority of the wing or foil rests above the waterline, no debris is able to easily flow back out of filter should pressurized water cease flowing to head.

ILLUSTRATIVE ASPECTS

As used below, any reference to a series of aspects (e.g., "Aspects A-D") or non-enumerated group of aspects (e.g., "any previous or subsequent aspect") is to be understood as a reference to each of those aspects disjunctively (e.g., "Aspects A-D" is to be understood as "Aspects A, B, C, or D").

Aspect A is a skimming device comprising a head that is buoyant in water of a pool and means for adjusting a position of the head within the water of the pool.

Aspect B is the skimming device of any previous or subsequent aspect, wherein the adjusting means comprises means for raising and lowering the head.

Aspect C is the skimming device of any previous or subsequent aspect, wherein the adjusting means comprises means for levelling the head relative to an upper surface of the water of the pool.

Aspect D is the skimming device of any previous or subsequent aspect, wherein the skimming device is configured to accept at least one chlorine tablet.

Aspect E is the skimming device of any previous or subsequent aspect, wherein the head is configured to receive pressurized water.

Aspect F is the skimming device of any previous or subsequent aspect, further comprising a ball joint configured to permit adjustment of a position of the head relative to a return line of the pool in at least one direction.

Aspect G is the skimming device of any previous or subsequent aspect, further comprising a by-pass valve for relieving pressure in the skimming device.

Aspect H is a skimming device comprising means for receiving pressurized water, a wing or foil, a filter, and means for causing the pressurized water to flow over the wing or foil so as to draw water and debris of a pool over the wing or foil into the filter.

Aspect I is the skimming device of any previous or subsequent aspect, wherein the causing means comprises a channel.

Aspect J is the skimming device of any previous or subsequent aspect, wherein the wing or foil is positioned at least partially within the channel to permit the pressurized water to flow over the wing or foil.

Aspect K is the skimming device of any previous or subsequent aspect, wherein the causing means further comprises a baffle positioned at least partly in the channel.

Aspect L is the skimming device of any previous or subsequent aspect, wherein the baffle has an X-shaped cross section.

Aspect M is the skimming device of any previous or subsequent aspect, wherein the wing or foil further comprises at least one standoff for maintaining a gap in the causing means.

Aspect N is the skimming device of any previous or subsequent aspect, further comprising means for levelling a head of the skimming device relative to an upper surface of the water of the pool.

Aspect O is the skimming device of any previous or subsequent aspect, wherein the means for levelling the head relative to an upper surface of the water of the pool comprises a swivel.

Aspect P is a method comprising receiving pressurized water of a pool through an inlet of a head of a skimming device, forming, by a wing or foil inserted in a channel of the head of the skimming device, a blade of water from the pressurized water, and entraining water and debris in the blade of water in a filter of the skimming device.

Aspect Q is the method of any previous or subsequent aspect, further comprising distributing the pressurized water within the channel using an internal baffle.

Aspect R is the method of any previous or subsequent aspect, wherein the head is buoyant in water of the pool.

Aspect S is the method of any previous or subsequent aspect, adjusting, by one or more swivels of the skimming device, a position of the head within water of the pool based on an upper surface of the water of the pool.

Aspect T is the method of any previous or subsequent aspect, wherein adjusting the position of the head comprises the one or more swivels levelling the head relative to the upper surface of the water of the pool.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The entire contents of the Bisseker patent are incorporated herein by this reference. Further, although applicant has described skimming devices for use with water containing vessels, persons skilled in the relevant field will recognize that the present invention may be employed in other manners. As one of many such examples, the devices additionally or alternatively could be configured to receive one or more chlorine tablets for dispersion into the water. Finally, references to "pools" and "swimming pools" herein may also refer to spas or other water containing vessels used for recreation or therapy and for which cleaning is needed or desired.

What is claimed is:

1. A skimming device comprising:
   means for receiving pressurized water;
   a wing or foil configured to extend at least partially above a waterline of a pool;
   a filter; and
   means for causing the pressurized water to flow as a blade of water upwards and over the wing or foil so as to draw water and debris of a pool over the wing or foil into the filter, wherein a portion of the wing or foil is inserted into the means for causing the pressurized water to flow, and wherein the means for causing the pressurized water to flow as the blade of water is upstream from the wing or foil.

2. The skimming device of claim 1, wherein the means for causing the pressurized water to flow over the wing or foil comprises a channel.

3. The skimming device of claim 2, wherein the means for causing the pressurized water to flow over the wing or foil further comprises a baffle positioned at least partly in the channel.

4. The skimming device of claim 3, wherein the baffle has an X-shaped cross section.

5. The skimming device of claim 1, wherein the wing or foil further comprises at least one standoff for maintaining a gap in the means for causing the pressurized water to flow over the wing or foil.

6. The skimming device of claim 1, further comprising means for levelling a head of the skimming device relative to an upper surface of the water of the pool.

7. The skimming device of claim 6, wherein the means for levelling the head relative to an upper surface of the water of the pool comprises a swivel.

8. A method comprising:
   receiving pressurized water of a pool through an inlet of a head of a skimming device;
   forming, by a portion of a wing or foil inserted in a channel of the head of the skimming device, a blade of water from the pressurized water upwards and over the wing or foil, wherein the wing or foil extends at least partially above a waterline of the pool and the blade of water is formed between a lid and a lower assembly of the head of the skimming device; and
   entraining water and debris in the blade of water in a filter of the lower assembly of the skimming device.

9. The method of claim 8, further comprising distributing the pressurized water within the channel using an internal baffle.

10. The method of claim 8, wherein the head is buoyant in water of the pool.

11. The method of claim 8, further comprising adjusting, by one or more swivels of the skimming device, a position of the head within water of the pool based on an upper surface of the water of the pool.

12. The method of claim 11, wherein adjusting the position of the head comprises the one or more swivels levelling the head relative to the upper surface of the water of the pool.

13. A skimming device comprising:
   means for receiving pressurized water;
   a lid comprising a wing or foil;
   a lower assembly attachable to the lid, the lower assembly comprising a filter attachable to the lid; and
   means for causing the pressurized water to flow upwards and over the wing or foil as a blade of water between the lid and the lower assembly so as to draw water and debris of a pool over the wing or foil into the filter, wherein a portion of the wing or foil is inserted into the means for causing the pressurized water to flow.

* * * * *